(12) United States Patent
Steidinger et al.

(10) Patent No.: US 7,665,669 B2
(45) Date of Patent: Feb. 23, 2010

(54) METHOD AND APPARATUS FOR MAKING RFID LABELS

(75) Inventors: Mark S Steidinger, McHenry, IL (US); David J Steidinger, Barrington, IL (US); David E Machamer, Wauconda, IL (US)

(73) Assignee: Tamarack Products, Inc., Wauconda, IL (US)

( * ) Notice: Subject to any disclaimer, the term of this patent is extended or adjusted under 35 U.S.C. 154(b) by 0 days.

(21) Appl. No.: 11/912,332

(22) PCT Filed: Apr. 25, 2006

(86) PCT No.: PCT/US2006/015986

§ 371 (c)(1),
(2), (4) Date: Oct. 23, 2007

(87) PCT Pub. No.: WO2006/116586

PCT Pub. Date: Nov. 2, 2006

(65) Prior Publication Data

US 2008/0202300 A1 Aug. 28, 2008

Related U.S. Application Data

(60) Provisional application No. 60/674,439, filed on Apr. 25, 2005.

(51) Int. Cl.
*G06K 19/06* (2006.01)

(52) U.S. Cl. ..................................... 235/492; 156/264
(58) Field of Classification Search .................. 235/435, 235/487, 492; 156/264
See application file for complete search history.

(56) References Cited

U.S. PATENT DOCUMENTS

| 6,207,001 | B1 * | 3/2001 | Steidinger et al. ............ 156/264 |
| 6,451,154 | B1 | 9/2002 | Grabau et al. |
| 6,557,766 | B1 * | 5/2003 | Leighton ...................... 235/488 |
| 6,940,408 | B2 | 9/2005 | Ferguson et al. |
| 6,951,596 | B2 | 10/2005 | Green et al. |

* cited by examiner

*Primary Examiner*—Seung H Lee
(74) *Attorney, Agent, or Firm*—Wildman, Harrold Allen & Dixon LLP

(57) ABSTRACT

Methods of cutting and applying RFID straps including microchips, by means of rotating vacuum and cutting cylinders to vary the feed rate of the strap web and/or the angular velocity of the cutting cylinder to avoid contact between the cutting blade and the superposed element on the strap web while severing the strap web at the desired cutting position. In one embodiment, the feed rate of the strap web is controlled. In a second embodiment, the strap web is fed at a substantially constant rate while the angular velocity of the cutting cylinder is controlled to avoid damage to the microchips. In a third embodiment, the feed rate of the strap web adjacent the desired cutting position is reduced and then accelerated and returned to normal by a deflecting arm.

22 Claims, 19 Drawing Sheets

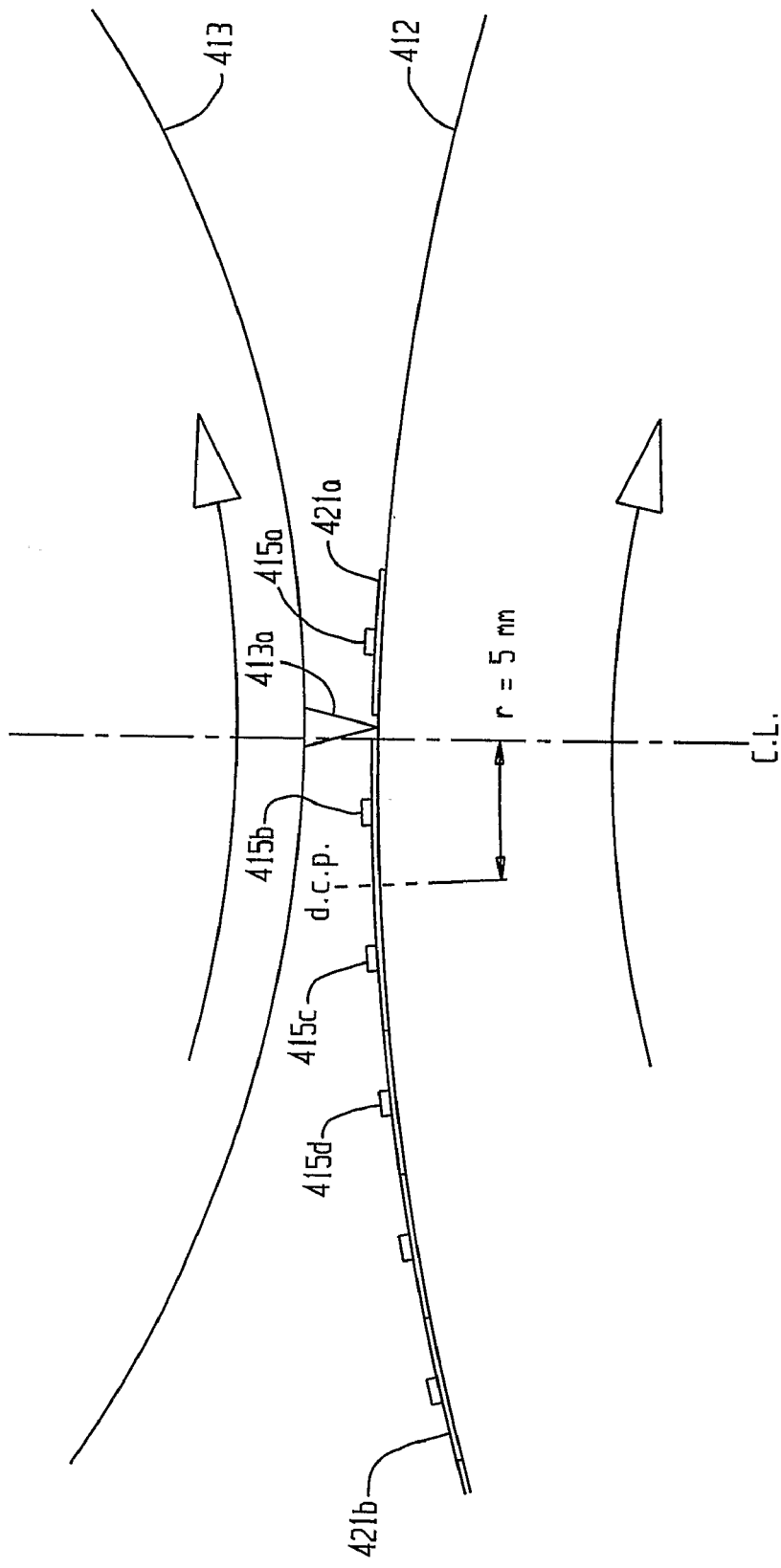

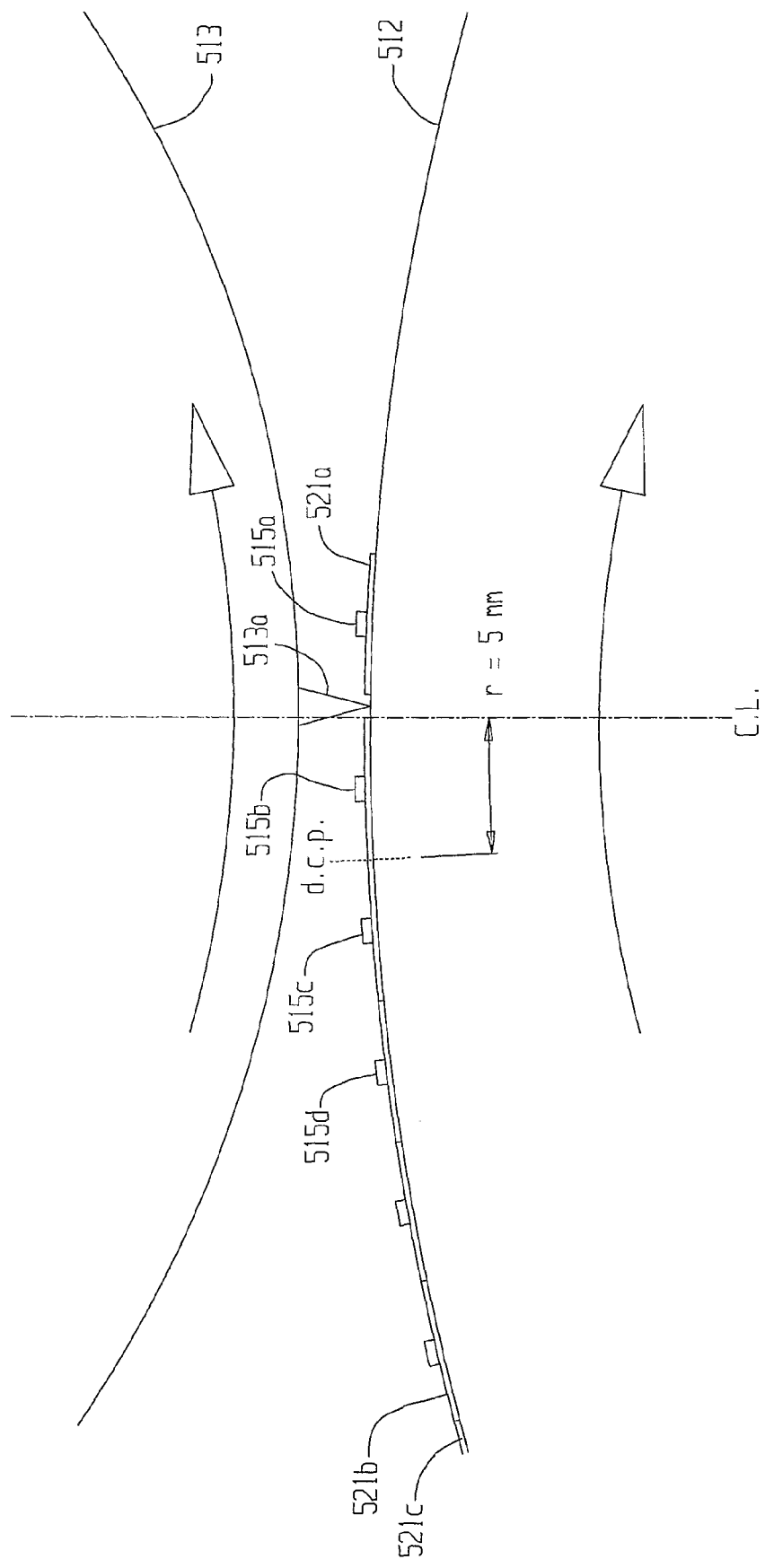

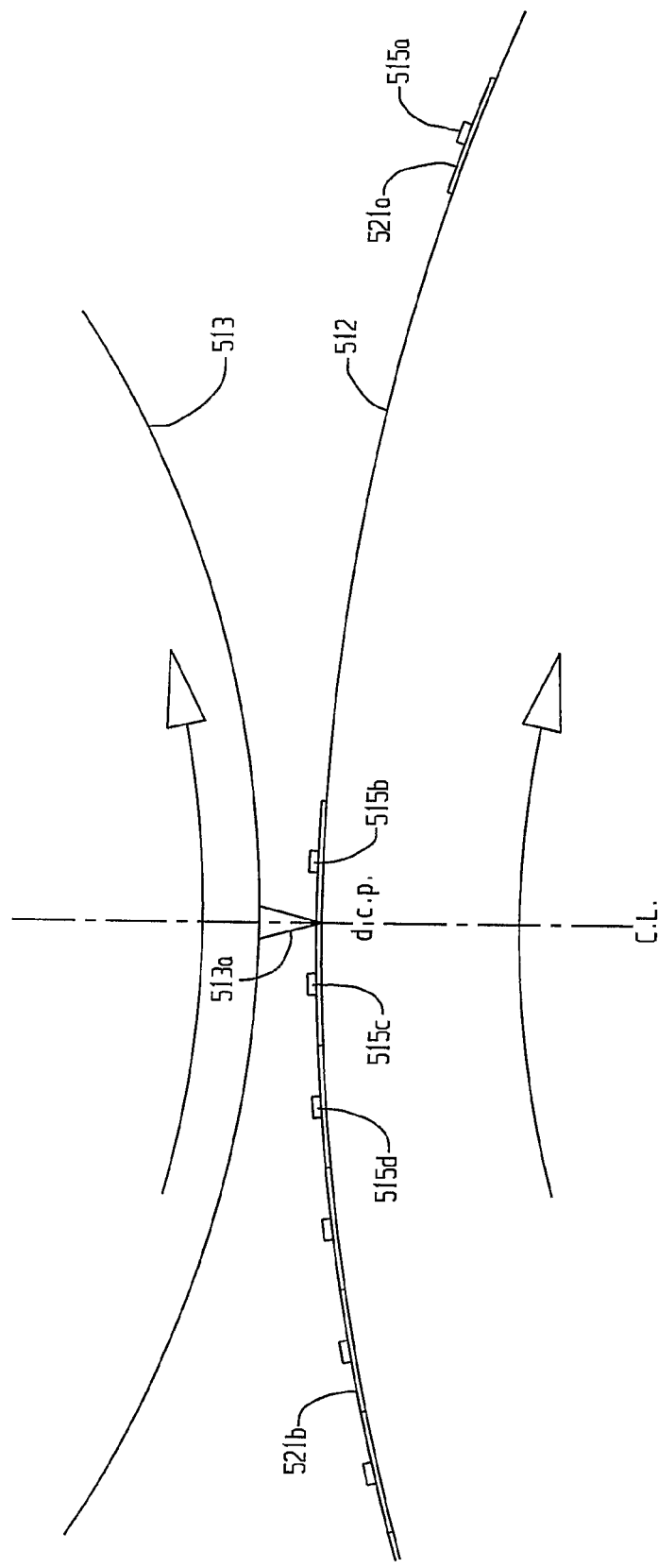

METHOD AND APPARATUS FOR MAKING RFID LABELS

RELATED APPLICATION

This application claims the benefit of the filing date of co-pending U.S. Provisional Application No. 60/674,439, filed Apr. 25, 2005.

FIELD OF THE INVENTION

The present invention relates to the manufacture of RFID (radio frequency identification) articles such as labels, tags or inlays which include RFID devices.

BACKGROUND OF THE INVENTION

RFID (radio frequency identification) transponders, incorporated into inlays or tags include an antenna and an associated electronic microchip with memory for storing data which may be read (Read Only) and, in some configurations, memory for storing and changing data (Read/Write) on the microchip. RFID inlays may include a battery, in the case of an active RFID inlay or RF energy may be used to energize and interact with the microchip in the case of a passive RFID inlay. Radio frequency electrical energy is communicated to and from the microchip via the antenna, as is well known. Pre-assembled RFID inlays typically include an etched copper or aluminum antenna formed on a plastic film and are provided by suppliers such as Alien Technology, Morgan Hill, Calif., Omron Electronics of Tokyo, Japan, Texas Instruments of Plano, Tex., and Rafsec of Tampere, Finland. Printed antennas may also be used in pre-assembled RFID inlays.

Preassembled RFID inlays may be applied between conventional label facestock and liner to provide an RFID label. The process of placing an RFID inlay between facestock and liner is often called inserting. Inserting may be accomplished by delaminating (i.e. separating) label facestock and liner, applying or inserting the RFID inlay on the exposed adhesive side of the facestock and then relaminating the facestock/inlay combination with the liner. Equipment for inserting RFID inlays is available from Melzer GmbH of Schwelm, Germany or Tamarack Products of Wauconda, Ill. U.S. Pat. No. 6,019,865 of Palmer et al. and U.S. Pat. No. 6,451,154 of Grabau et al. describe, among other things, processes for applying adhesive and release coatings to make label stock in situ and inserting RFID inlays (or simply, "inlays") to make RFID labels both with and without liner.

As used herein, an "inlay" comprises an RFID microchip electronically coupled to an associated antenna. The chip may be directly attached to the antenna, or it may be attached using intermediate conductive pads to facilitate the connection, as discussed further below. In general, a roll of unseparated inlays forming an inlay web is unwound and fed to a rotating cutting cylinder which cuts individual inlays in register with the antenna/chip pattern or repeat (to avoid cutting the antenna or damaging the chip) to provide individual or singulated inlays. The singulated inlays are carried on a rotating vacuum cylinder (which cooperates with the cutting cylinder to complete the cut) and brought into contact with adhesive on one side of the label face stock. In an alternative process, the singulated inlays may be joined to the release liner with either an adhesive on one side of the inlay (an inlay carrying an adhesive is sometimes referred to as a "wet" inlay) or an adhesive on at least the portion of liner in register with an inlay.

RFID straps are relatively small (approximately 5 mm×10 mm when viewed from above) intermediate components or units that may be used in the manufacture of RFID inlays, transponders or other devices. RFID straps typically include a film substrate such as PET (polyethylene terephthalate) polyester or Kapton (polyamide) which includes a microchip attached to electrically conductive pads. The strap is then attached to a printed, etched, foil-stamped, or fine wire antenna to form an RFID inlay or an RFID article such as a label, transponder, or tag. RFID straps are provided by suppliers such as Alien Technologies of Morgan Hill, Ca, and Texas Instruments of Plano, Tex.

An RFID strap at approximately 5 mm×10 mm, while relatively small, is nevertheless considerably easier to handle and apply than much smaller microchips at approximately 0.75 mm square or smaller. An RFID microchip is typically applied in controlled environments by precision pick-and-place devices such as provided by Universal Instruments Corporation of Binghamton, N.Y. or Mühlbauer AG High Tech International of Roding, Germany. RFID straps, however, may be attached to associated antennas with less precise equipment in a less 'clean' environment than attaching the chips directly to antennas. Compared to pre-assembled, inserted RFID inlays, the combination of (i) an RFID antenna printed with conductive ink directly on a paper or plastic label facestock, or directly on a cartonboard or corrugated stock and (ii) an RFID strap may allow significant cost savings and greater flexibility in customizing antennas for specific purposes.

For many years, an applicator apparatus known as the Tamarack Label Applicator described in U.S. Pat. No. 6,207,001 has been used to cut a piece of material, known as a patch, from a strap web, known as the patch web and apply it to another web of material, known as the carrier web. This applicator has been used to make business forms with integral labels (for example, the integral label of U.S. Pat. No. 4,379,573 of Lomeli et al.) and integral cards and to apply RFID inlays to business forms and label webs. It would be desirable to have an apparatus similar to current vacuum cylinder applicators such as that supplied by Tamarack Products to apply both RFID inlays and RFID straps. With servo-driven feeding, cutting, and vacuum cylinder axes, such vacuum cylinder control systems provide convenience, accuracy and control for handling a wide variety of materials, cut widths, cut lengths and applied pitch or repeat.

The typical geometry of the vacuum cylinder applicator, however, causes a problem when cutting a strap web into individual straps due to both the relatively small cut length (approx. 5 mm) combined with the height of the microchip above the strap carrier film (approx. 0.3 mm). The problem is that the cutting blade sweeps through the space occupied by the microchip. This can destroy the microchip and/or push the strap web ahead causing the cut to occur at a location on the straps other than the desired cut position (d.c.p.).

SUMMARY OF THE INVENTION

The present invention contemplates controlling the relative speeds and positions of the cutting blade and the strap web so that the cutting blade engages and cuts the strap web at the desired cut position to form individual RFID straps, but does not impinge on or otherwise contact the microchip carried on top of the strap web.

In one embodiment of the invention, the cutting blade cylinder rotates according to its normal motion profile and the speed of the strap web is controlled so that the strap web accelerates to a speed approaching the speed of the blade tip, and the strap web position is controlled so that the space between two adjacent microchips on straps next to be severed, stays approximately under the cutting blade until the cut is completed. Then the strap web decelerates, reducing the relative speed of the strap web until the next cutting cycle. This delays the chip or strap, allowing adequate clearance between the next blade/chip passage.

In another embodiment of the invention, the strap web speed is held essentially constant and the cutting blade speed and, thus its position, is controlled so that the blade slows to approximately the speed of the strap web as the blade reaches an intermediate position (the desired cutting position) between the two adjacent chips on the strap web. When the blade clears the chip and approaches the d.c.p., it is accelerated to approach the surface speed of the vacuum cylinder to avoid or minimize scuffing of the blade tip against the vacuum cylinder surface.

In a further embodiment, both the strap web and the cutting blade speed may be controlled or profiled to reduce the acceleration and deceleration requirements on both the strap web feeding and cutting blade rotation systems. While the motion control becomes more complex, the motion profiles may be 'softened' to allow smoother operation and reduced tension variations on the strap web. In still another variation, the feed web may be deflected mechanically so that its path is made longer, thereby temporarily adjusting the speed of the strap web downstream of the deflection.

Other features and advantages of the present invention will be apparent to persons skilled in the art from the following detailed description of the illustrated embodiments, wherein identical reference numerals will refer to similar parts in the various views.

BRIEF DESCRIPTION OF THE DRAWINGS

FIG. 4A-D are enlarged schematic views of a sequential depiction of cutting straps with a prior art method;

FIGS. 5A-D are enlarged schematic views of sequential steps in cutting and indexing RFID straps according to the present invention;

DETAILED DESCRIPTION

Figure 1:
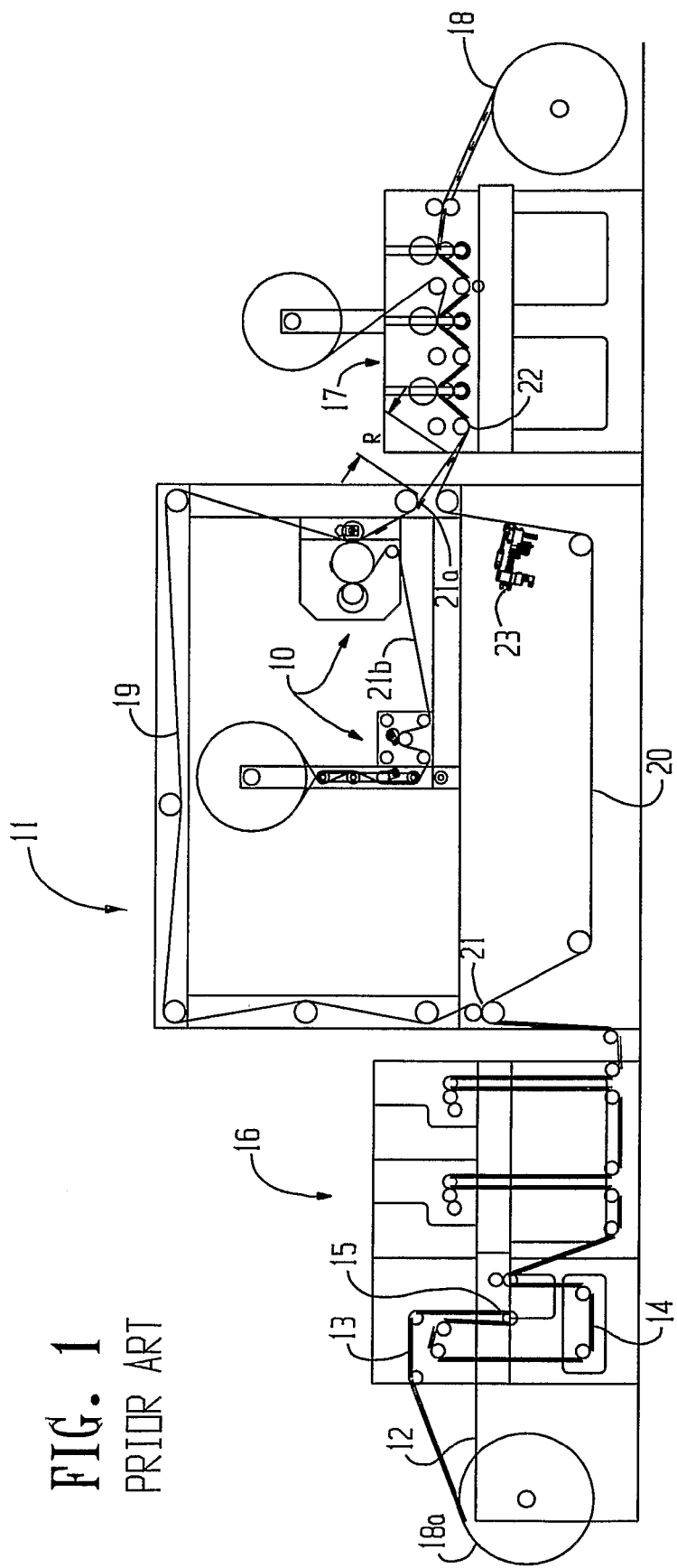
FIG. 1 is a side schematic view of a prior apparatus that may be used to insert RFID inlays.

FIG. 1 shows a prior art patch applicator apparatus ("applicator", for short) 10 in conjunction with a printing press 11, in this example a flexographic press such as provided by Mark Andy Inc. of St. Louis, Mo. and often used to make pressure sensitive labels and other products. The press 11 includes a conventional roll unwind station 12, with splicing table 13, strap web guide 14 tension control 15, a plurality of print stations 16, die cutting, slitting, and pull section 17, and roll rewind stations 18. A flexographic press may be configured in various ways and modules may be added or deleted as required to make various products. With the addition of the patch applicator section 10, the press 11 shown in FIG. 1 is used to make RFID labels, among other things, and starts with a roll of label stock 18a.

The label stock roll 18a is unwound to provide a web of label stock that may be printed as required in the print stations 16. The label facestock 19 is delaminated from label liner 20 at delamination station 21. The patch applicator 10 may be used to cut RFID transponders, also known as inlays or tags 21a from a web of inlays 21b and apply the inlays 21a to the adhesive side of facestock web 19 at the desired location, a.k.a. in register or indexed, relative to the printing or other feature on the web 19. The facestock web 19 having inlays 21a affixed to it, spaced at a uniform distance, referred to as repeat 'R', is relaminated to liner 20 at relamination station 22. Thus, the inlays are said to be "inserted" into the label stock. An adhesive applicator head 23 may be used to apply an overall coating of adhesive, or more desirably, essentially rectangular patterns of adhesive that will be in register with the inlays 21a, to replace that portion of a continuous coating of adhesive on the facestock web 19 covered by inlays 21a. The relaminated web may be die cut to form RFID labels, slit and rewound, sheeted, or folded, for example, using existing press equipment.

Figure 1A:
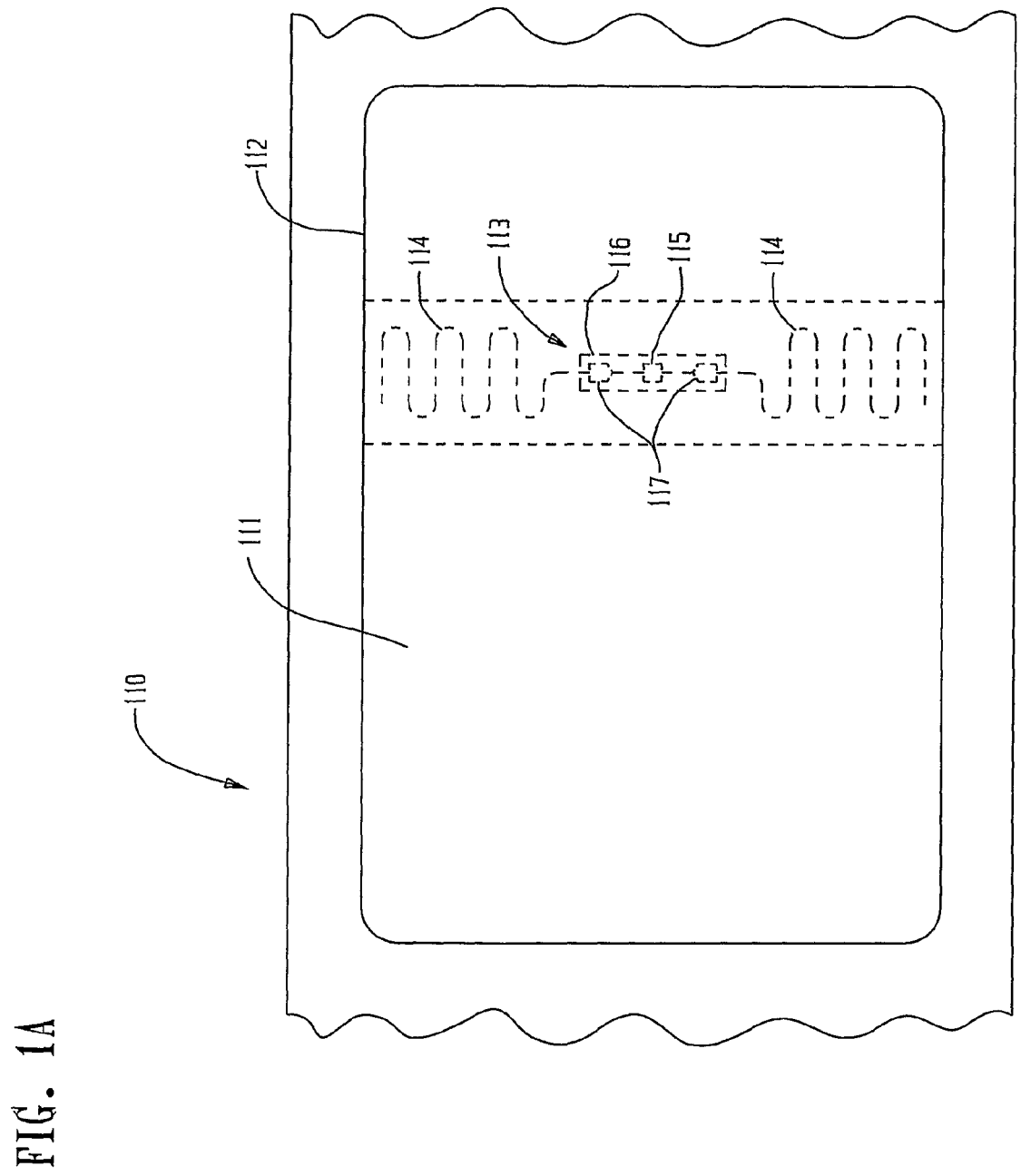
FIG. 1A is a top view of an RFID label including an RFID inlay.

FIG. 1A shows a typical RFID label 110 with label facestock 111, having die cut perimeter 112 and RFID inlay 113. RFID inlay 113 includes first and second antenna sections 114 and microchip 115. In some cases microchip 115 may be attached to antenna 114 or, in an alternative construction, microchip 115 may be attached to the inlay 113 and connected to the antenna sections via an intermediate, referred to as a strap 116. Strap 116 includes microchip 115 which is conductively coupled to conductive pads 117 on strap 116. The conductive pads 117 are used to conductively couple to antenna 114 and to reduce the tolerances which would otherwise be required to connect the small chip 115 directly to the antenna sections 114.

Figure 2:
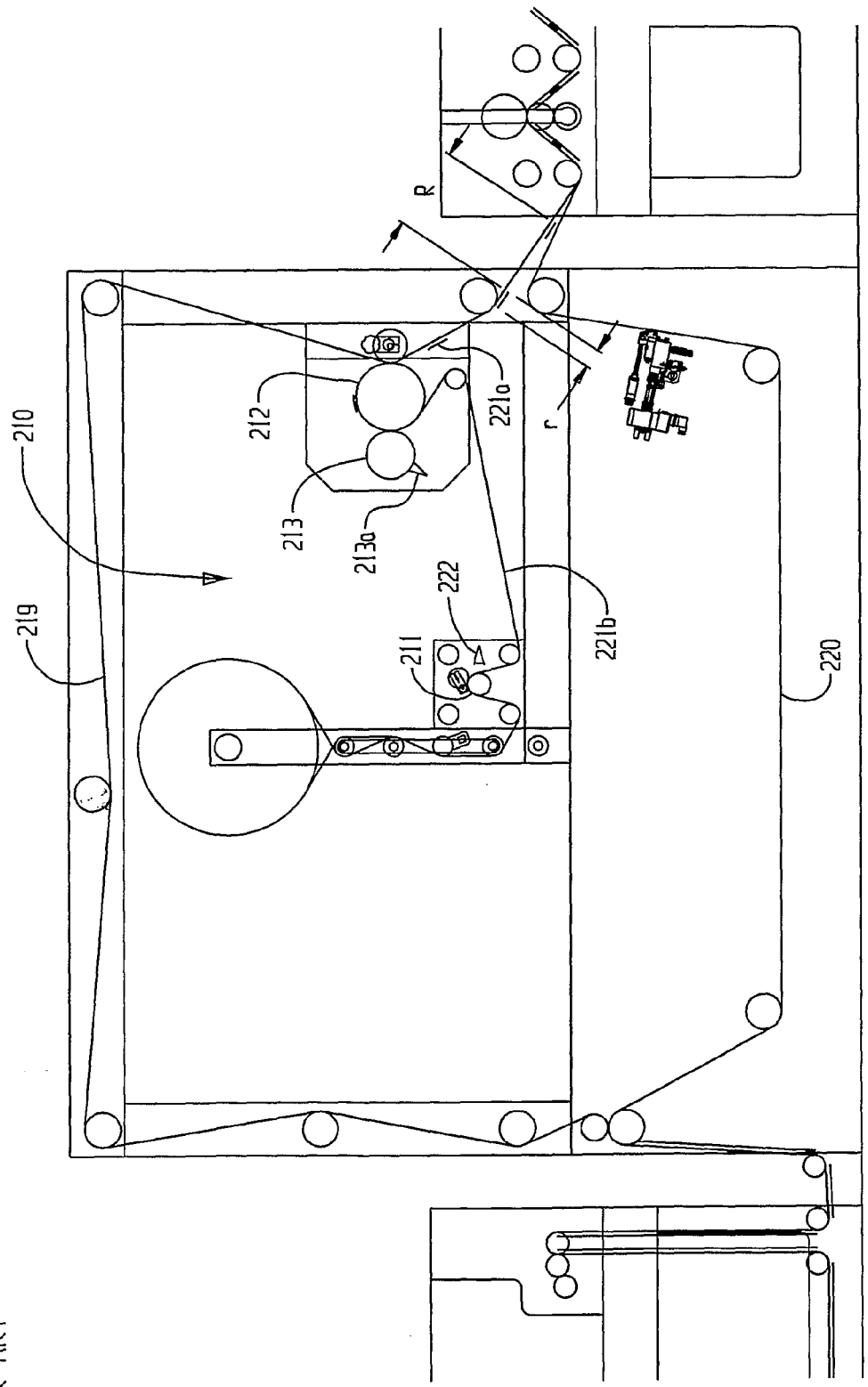
FIG. 2 is a side schematic view of a prior art applicator apparatus for inserting RFID inlays into label stock.

FIG. 2 is a larger view of a prior art applicator apparatus 210, with a feed cylinder 211 that cooperates with a vacuum cylinder 212 and cutting cylinder 213 to cut a series of patches or singulated pieces 221a from a strap web 221b. The vacuum cylinder 212 rotates clockwise so that its surface speed is essentially the same speed as the carrier web 219 so that the patches 221a are applied at a desired pitch or repeat 'R' on the carrier web 219 (i.e. at uniform spacing) and with a relatively accurate positioning or register capability so that the patches can be indexed to a desired location relative to the label or other article being made. The patch web 221b has traditionally been fed at a constant rate by feed cylinder 211. That rate is in proportion to the feed rate of the carrier web 219, and that proportion is the ratio of the patch length or repeat 'r' and the repeat 'R' of the carrier web which is the distance between corresponding locations (e.g. leading edge) of adjacent patches on the carrier web 219. For example, if a patch 221a, having a length of 1.2" is applied to the carrier web with a repeat 'R' of 12", the patch web 221b is fed at a constant speed of ⅒ of the carrier web speed 219. In this context, the "length" of a patch (such as an inlay or strap) is measured along the feed direction. The patch web 221b slips on the vacuum cylinder 212 until it is severed by the cooperating cutting knife 213a, and the severed patch is then carried by the vacuum cylinder (which is provided with a plurality of surface apertures under suction) so that the severed patch travels essentially at the surface speed of vacuum cylinder 212.

To maintain the sharp tip of the cutting blade 213a, the tip of the cutting blade 213a and the surface of the vacuum cylinder 212 move at substantially the same speeds especially when the tip or cutting edge of blade 213a is in contact with the surface of the vacuum cylinder 212 during a cut. The portion of cutting cylinder 213 and vacuum cylinder 212 rotation where the cutting blade 213a engages the material to be cut 221b, penetrates the material to be cut and contacts the vacuum cylinder 212 is referred to as the "cutting zone". A scanner 222 such as provided by Keyance of Woodcliff Lake, N.J. may be used as part of a closed-loop feedback system to adjust feed cylinder 211 rotation so that the cut occurs in the desired cut position, or in register with, web 221b. In this case, the desired cut position is between antenna patterns of adjacent inlays on web 221b.

The patch repeat 'R' on the carrier web 219 may be controlled by the physical size or circumference of the cutting cylinder 213. For example, a patch 221a may be placed every 12" on the carrier web 221b by using a 12" circumference cylinder 213 with one cutting blade 213a. For every one revolution of the 12" circumference cutting cylinder 213, a patch 221a will be applied once on every 12" of carrier web 219. A patch 221a may placed on a 6" repeat 'R' by installing a second blade (not shown) in cutting cylinder 213, located 180 degrees from blade 213a. Or, a 14" repeat 'R' may be obtained by replacing the 12" circumference cutting cylinder 213 with a 14" circumference cutting cylinder.

In some cases, the rotational velocity of the cutting cylinder 213 may be varied cyclically to obtain different repeats 'R'. This technique is sometimes referred to as "profiling" and it allows patch application on different repeats 'R' while using a single, fixed-size cutting cylinder 213. For example, if a patch is desired on a 14" repeat using a 12" circumference cylinder, the cutting cylinder 213 is slowed down between cuts. This allows more of web 219 to pass the vacuum cylinder before the next cut is made. The cutting cylinder 213 is sped up during cuts to preserve matching speed when the tip or cutting edge of blade 213a contacts the vacuum cylinder 212. Such control of the cuffing cylinder speed may be obtained by using a programmable servo system such as that provided by Indramat of Lohr am Main, Germany.

In contrast to applying completed RFID inlays 113 (see FIG. 1A) to construct RFID labels 110, RFID labels 310 (see FIGS. 3 and 3A) may be manufactured by providing an RFID antenna 314 that may be printed in separate sections using conductive ink, stamped using conductive foil, or added using other methods, on the back of the label facestock 311. In this case, RFID straps 316 provide an intermediate carrier for a microchip 315 and its associated conductive contact pads 317. RFID straps 316 are larger and easier to handle as compared to individual microchips 315 which may be approximately 0.75 mm square×0.25 mm thick, or smaller. The RFID strap 316 includes a base film 317a (FIG. 3A) made of, for example, PET plastic material about 50-70 microns thick. Strap 316 also includes conductive connecting pads 317 for electrically coupling, contacting, or connecting the microchip 315 to the antenna 314. The electrical connection between antenna 314 and pads 317 of FIG. 3A may be made using a variety of methods, for example, with the use of conductive ink or paste, anisotropic adhesive, ultrasonic fastening or firm contact (diagrammatically illustrated at 317b in FIG. 3A) between conductive surfaces of the antenna sections 314 and connector pads 317. A layer of adhesive tape 318 that is larger in at least one dimension (transverse in FIG. 3) than the strap 316 (see FIG. 3) may be used to further secure the strap 316 to the back of the label facestock 311. The tape 318 may also provide additional protection for the strap, for example when the label liner 320 or other covering layer is removed from the back of the RFID label 310 to expose adhesive 323. In some cases the labels 310 may be self-wound, a practice known in the art that allows elimination of the liner 320 by means of release treating the exposed face side 310a of label 310.

Referencing FIG. 2, as an example, the strap web 221b is cut at a 5 mm (or 0.197") repeat 'r', and the cut portion 221a is placed on (i.e. indexed to a desired location on) 6⅛" label strap web repeat 'R'. Using the constant rate feed system of the prior art, the strap web 221b would travel at 0.032 (0.197"/ 6.125") times the label strap web speed. During at least the cutting portion of the cutting process, the tip of the cutting blade 213a would be traveling at essentially the speed of carrier web 219, or 31 times faster than the speed of strap web 221b.

Figure 4B:
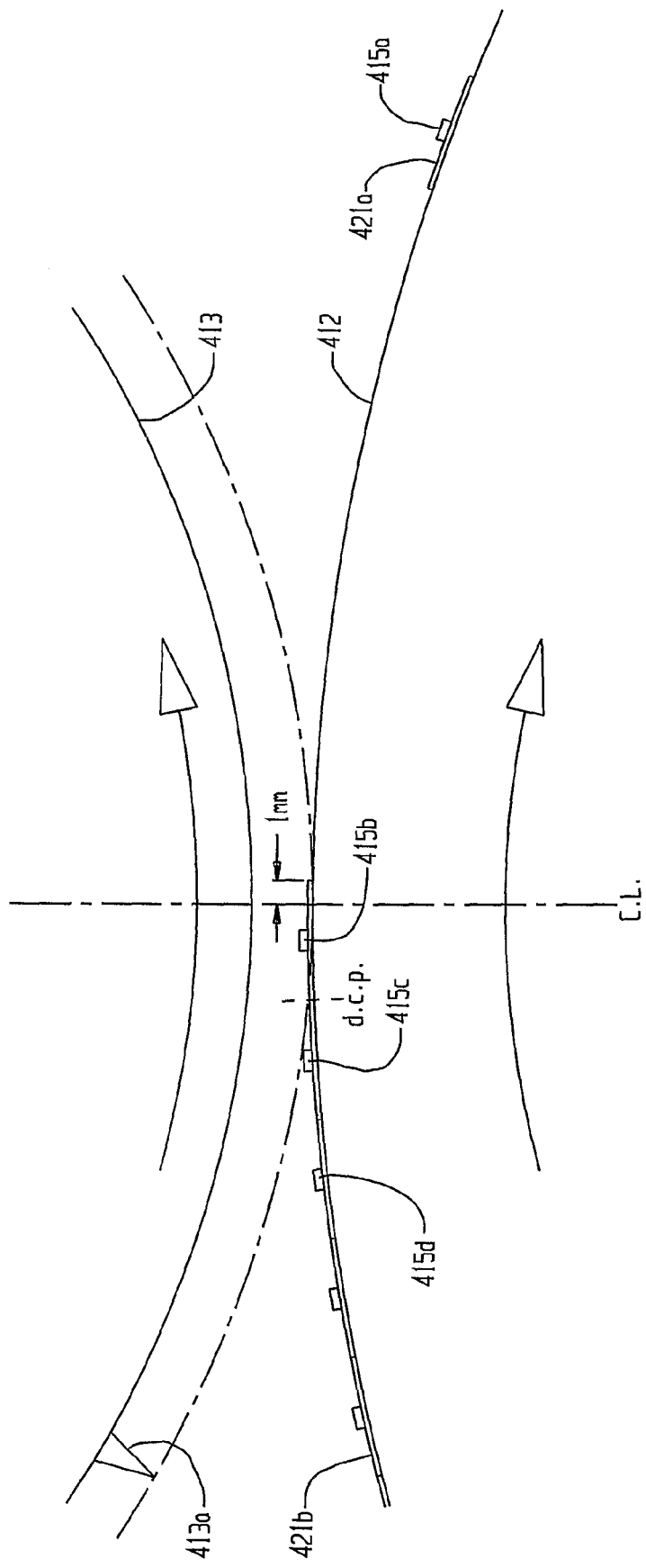

FIGS. 4A-D show schematic views of the prior art cutting method. Referring to FIG. 4A, in an enlarged view, the strap web 421b has just been cut. The cutting cylinder 413 has rotated cutting blade 413a defining a distal cutting edge through the cut zone and severed leading strap 421a as cutting blade 413a rotates past the centerline (technically, a plane perpendicular to the plane of the page of FIG. 4A), denoted C.L., of the cutting cylinder 413 and vacuum cylinder 412. The next cut should occur approximately halfway between the next two microchips 415b and 415c at the desired cutting position, d.c.p. when the d.c.p. is aligned with the C.L. plane of the cutting cylinder.

In FIG. 4B, the strap web 421b has advanced about 1 mm and the cutting blade 413a is approaching the strap web and cut zone prior to the next cut. The phantom line denotes the path the distal cutting edge of the blade 413a, and defines a blade envelope. It can be seen that the tip or cutting edge of blade 413a will collide with microchip 415c as the tip of blade 413a approaches the centerline C.L. and tip or cutting edge of blade 413a is moving approximately 31 times faster than strap web 421b. The position of severed strap 421a is not shown to scale on vacuum cylinder 412 in FIGS. 4B-4D.

Figure 4C:
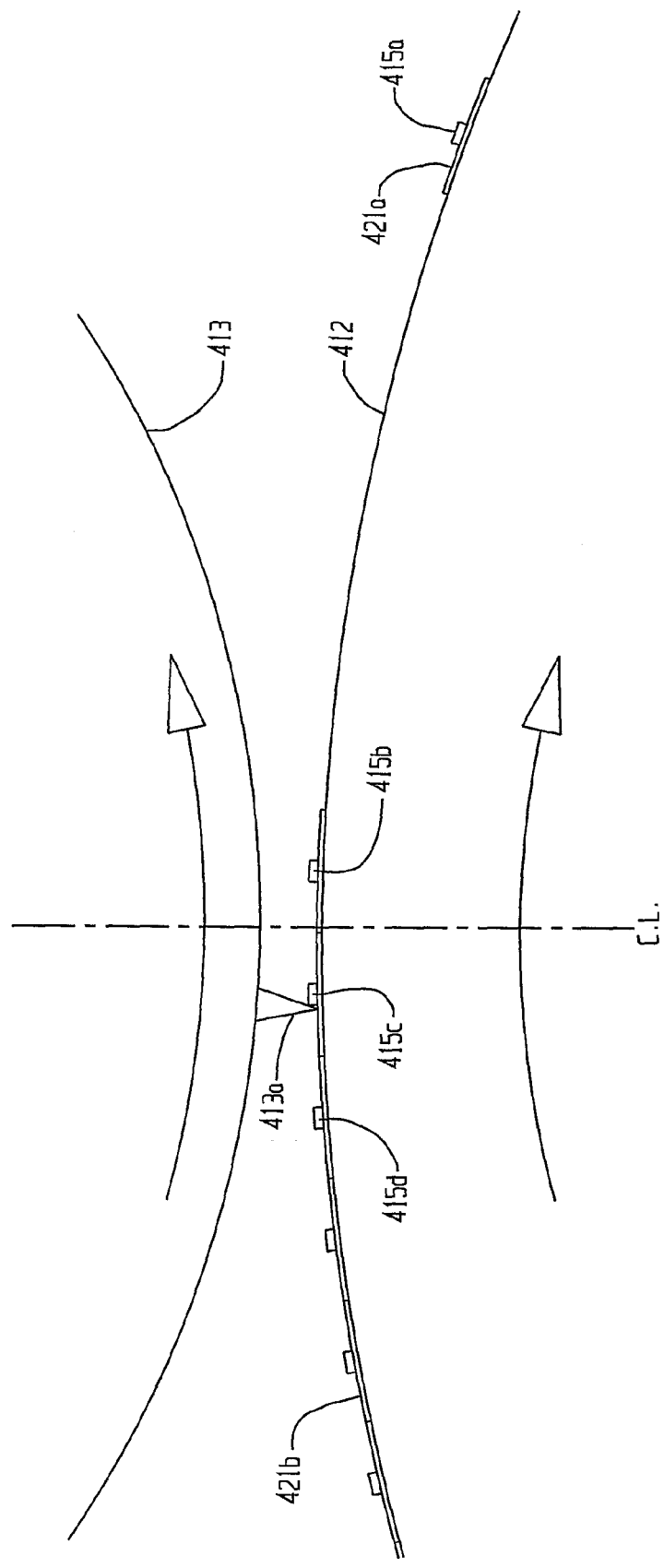

In FIG. 4C, the strap web 421b (which includes the uniformly spaced microchips such as shown at 415b, c, d) has advanced approximately 4 mm and the cutting blade 413a has advanced about 124 mm along the blade envelope. Cutting blade has struck microchip 415c from the rear. Microchip 415c will be damaged by the impact, perhaps even dislodged from its respective strap on the web of straps 421b.

Figure 4D:
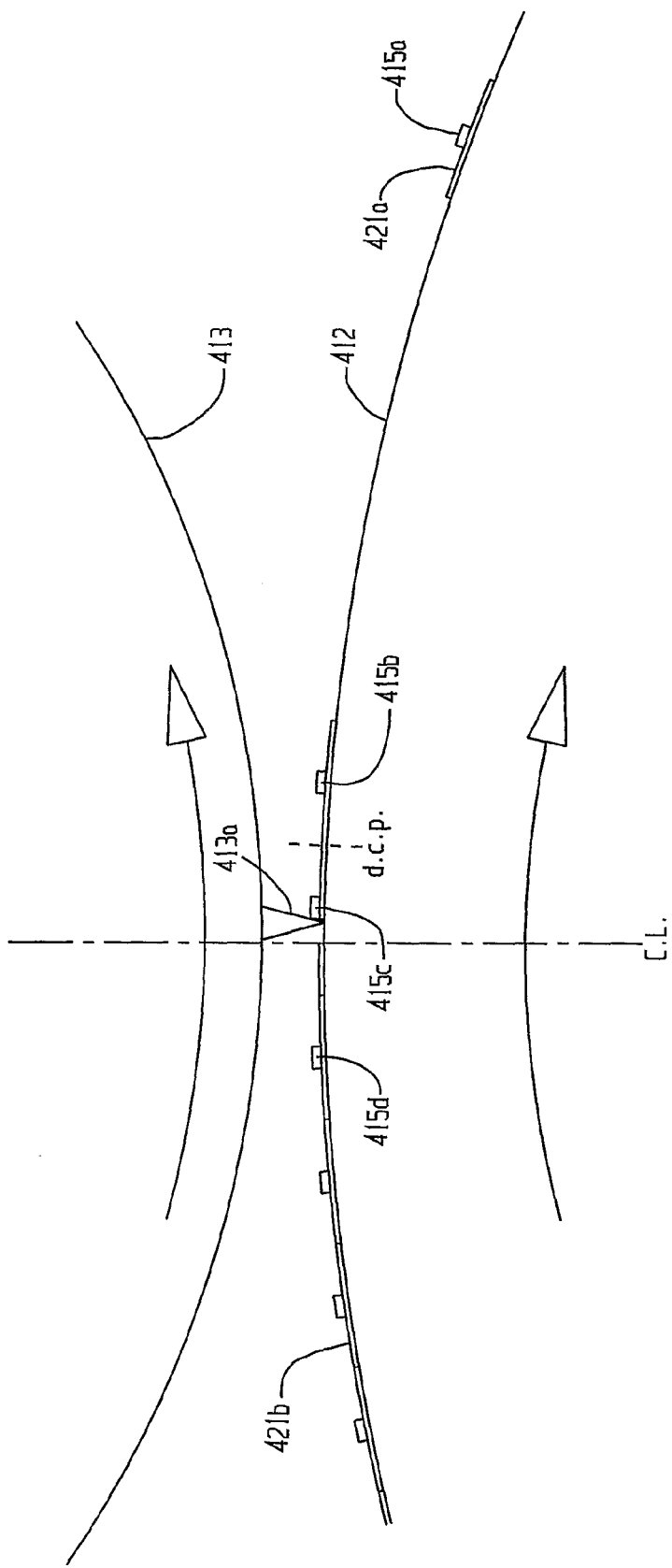

In FIG. 4D, a potential result of the blade 413a impacting microchip 415c is illustrated. Faster moving blade 413a has struck the edge of a preceding microchip 415c and forced the strap web 421b forward from its desired position on vacuum cylinder 412. Instead of cutting strap web 421b when the desired cut position, d.c.p., midway between microchips 415b and 415c, is located on the C.L., the cut occurs at the trailing edge of microchip 415c and approximately 1½ straps are cut off rather than one undamaged strap such as 421a.

Figure 5B:
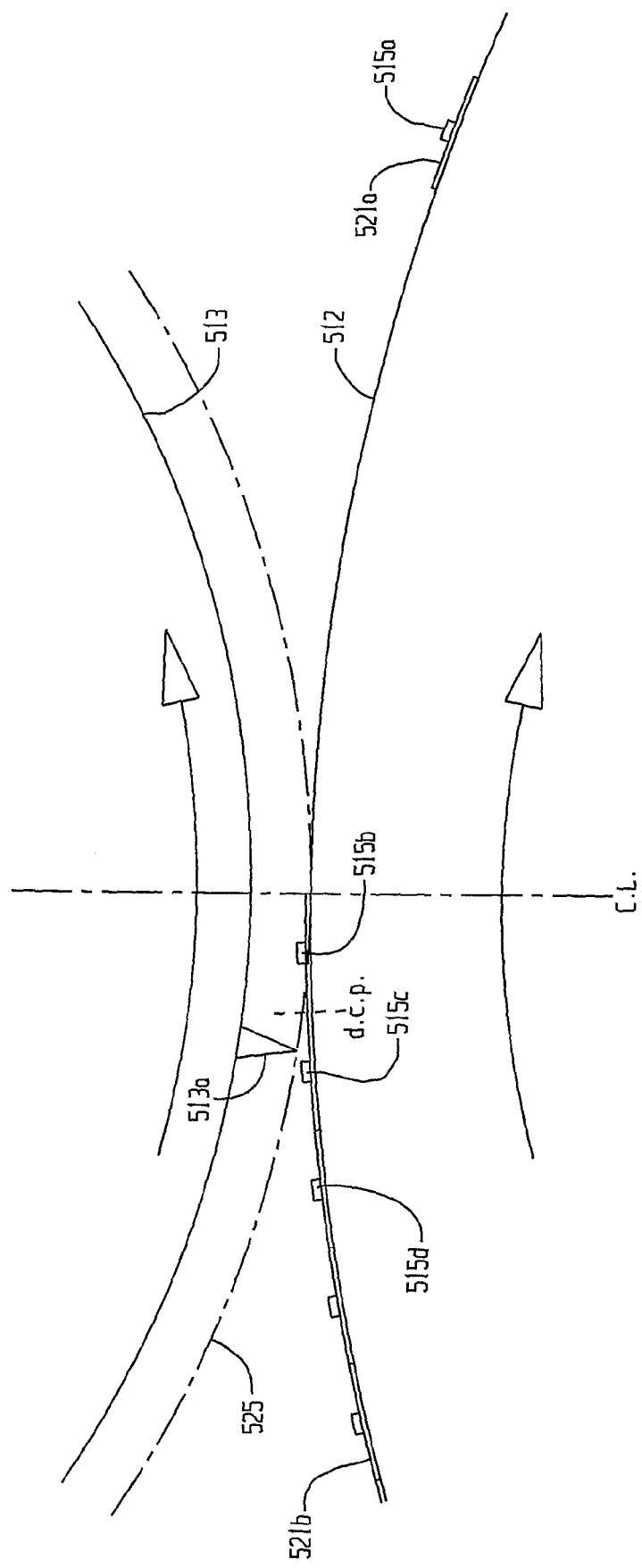

FIGS. 5A-D show an improved method for feeding and cutting straps. FIG. 5A shows the beginning of a cutting cycle. In this embodiment, the strap web may be the same as disclosed above. For clarity, it includes a continuous base web 521c on which a plurality of microchips (or similar "elements") 515a, 515b, etc. are fixed at uniform spacing. It will be observed that each microchip or other attached element 515a, etc. is fixed or superposed on an upper surface of strap web 521c and has a leading edge and a generally uniform depth (at least in the illustrated embodiment) which adds height to the individual straps (each comprised of a section of cut base web and a superposed element). Strap 521a has just been severed from strap web 521b by cutting blade 513a at the desired cutting position on the strap web and at the desired cutting location on the vacuum cylinder 512 (i.e. when the d.c.p. coincides with the C.L.).

In FIG. 5B, the feed of the strap web 521b has been significantly slowed or stopped compared to a constant feed rate as utilized in the prior art method. This allows cutting blade 513a, which is following its normal motion profile, to advance to a position between microchips 515b and 515c. In other words, the leading edge of a trailing superposed element 515c does not intersect the cut envelope 525 until the tip of blade 513a has passed. Again, the position of the several strap 591a relative to strap web 521b is not shown to scale in FIGS. 5B-5D.

Figure 5C:
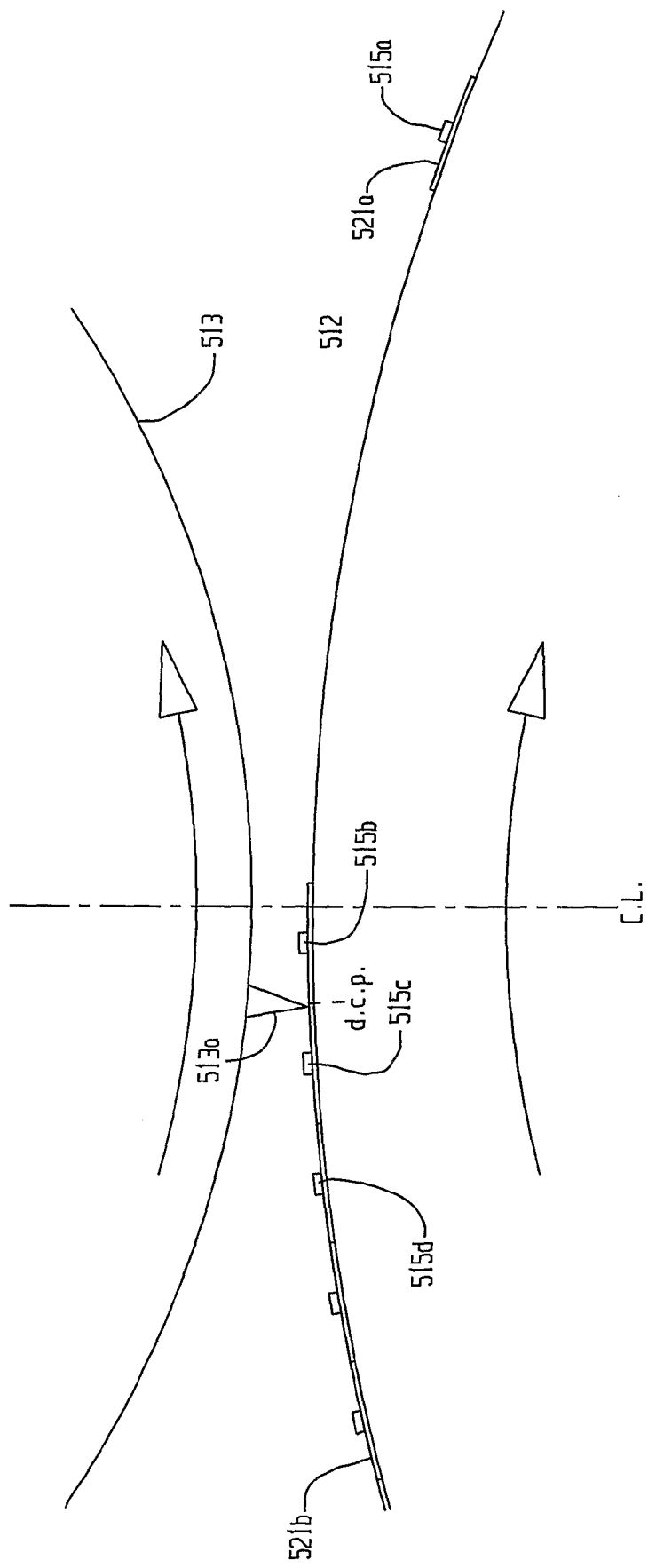

Once cutting blade 513a has cleared microchip 515c, strap web 521b is preferably accelerated so that the cutting blade 513a remains between adjacent microchips 515b and 515c until the cut is completed. This is illustrated in FIG. 5C where the strap web is advancing at a rate sufficient to keep the cuffing blade 513a between microchips 515b and 515c. FIG. 5D shows the leading strap web 521b further advanced and the cut occurring in the desired cut position at d.c.p. midway between leading microchip 515b and trailing microchip 515c and on center line C.L. It is desirable that the peak speed of the strap web 521b be kept below the surface speed of vacuum cylinder 512 so that tension (caused by vacuum openings in the surface of vacuum cylinder 512) will be maintained in strap web 521b. This prevents slack from developing in strap web 521b which can cause problems with laterally guiding the strap web 521b. Also, slack in strap web 521b can cause problems with scanning of strap web 521b to maintain closed-loop feedback for keeping the cut in registration midway between microchips, at the desired cutting position, d.c.p.

Once the cut is completed, the strap web 521b decelerates and the next cutting cycle begins.

A second method of controlling the relative motion of the strap web and the cutting blade has been invented and will now be described. This method allows the strap web to feed at a constant rate as with the prior art method. In this case, the angular velocity of the blade cylinder is varied in a controlled manner.

Figure 6A:
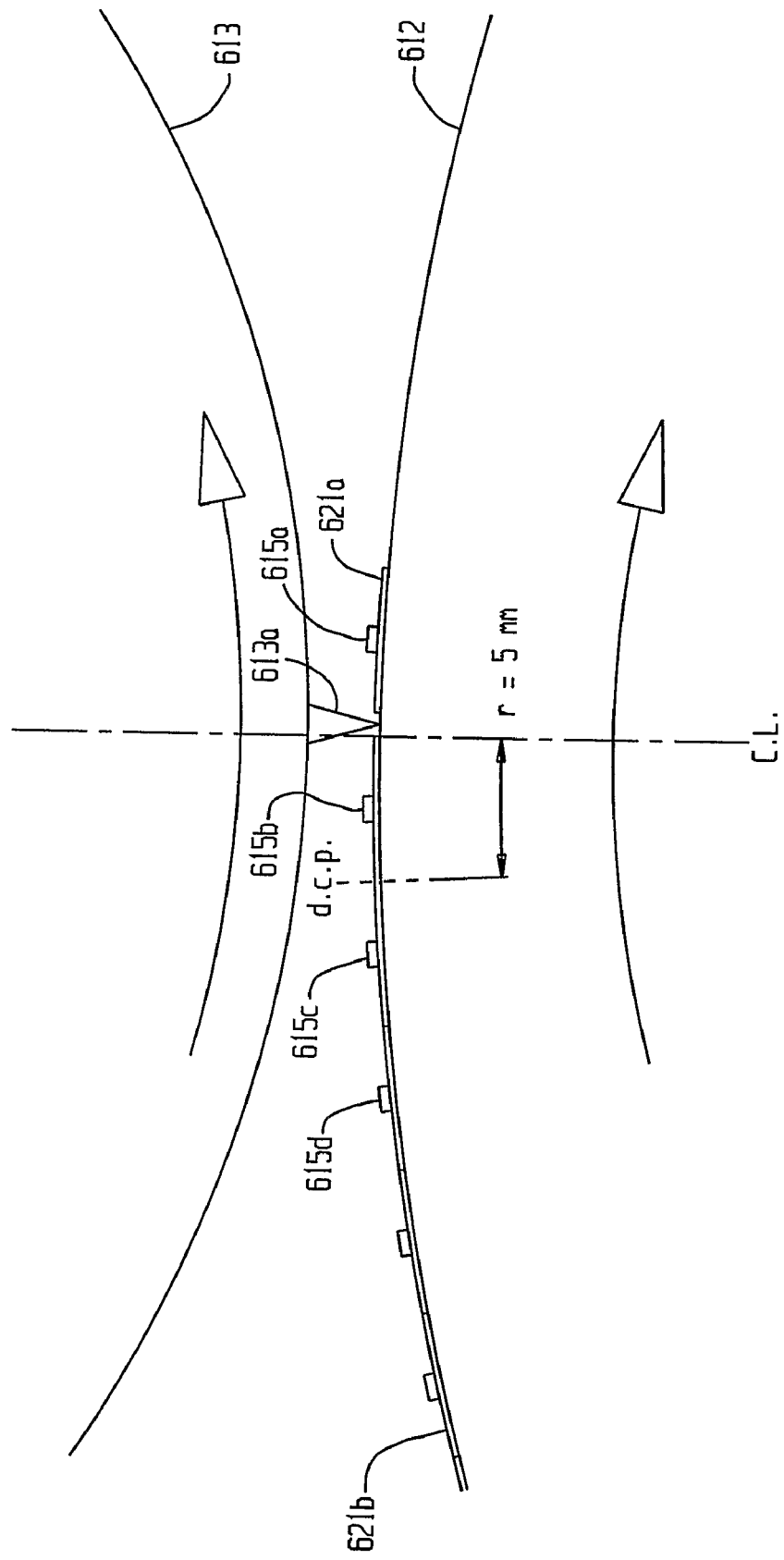
FIGS. 6A-D are enlarged schematic views of sequential steps in cutting and indexing straps with a second method according to the present invention.

Turning to FIG. 6A, strap 621a has just been severed from strap web 621b thus completing one cut cycle and commencing another. Once freed from the strap web, individual strap 621a will accelerate to the surface speed of vacuum cylinder 612, due to the securing vacuum. Again, in the example of a 5 mm strap cut length 'r' and a 6⅛" label repeat 'R', the vacuum cylinder 612 surface speed is approximately 31 times faster than the speed of strap web 621b. Cutting cylinder 613 continues its motion to rotate blade 613a through the cut zone as part of the next cut cycle.

Figure 6B:
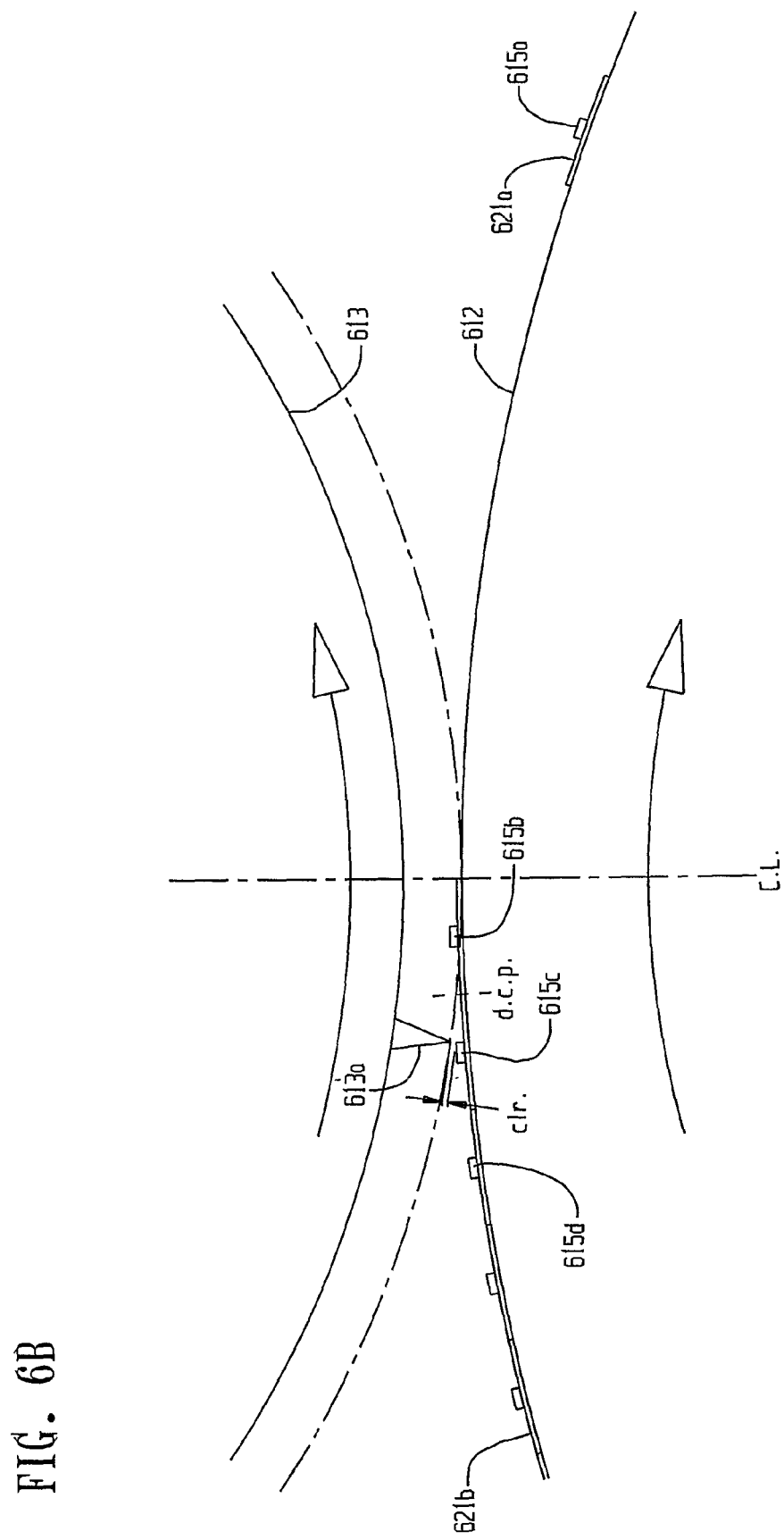

FIG. 6B shows a subsequent step in the cut cycle. Cutting cylinder 613 has rotated at an appropriate speed (i.e. the angular velocity increased) while the feed rate of the strap web remains substantially constant to bring the cutting edge of cutting blade 613a between microchips 615b and 615c. That is, the distal cutting edge of the blade passes the leading edge of the next succeeding chip 615c. Then cutting cylinder 613 is decelerated to approximately the speed of the strap web 621b so that blade 613a is positioned between adjacent microchips 615b and 615c as strap web 621b advances at uniform speed. Again, the position of severed strap 621a is not shown to scale in FIGS. 6B-6D.

Figure 6C:
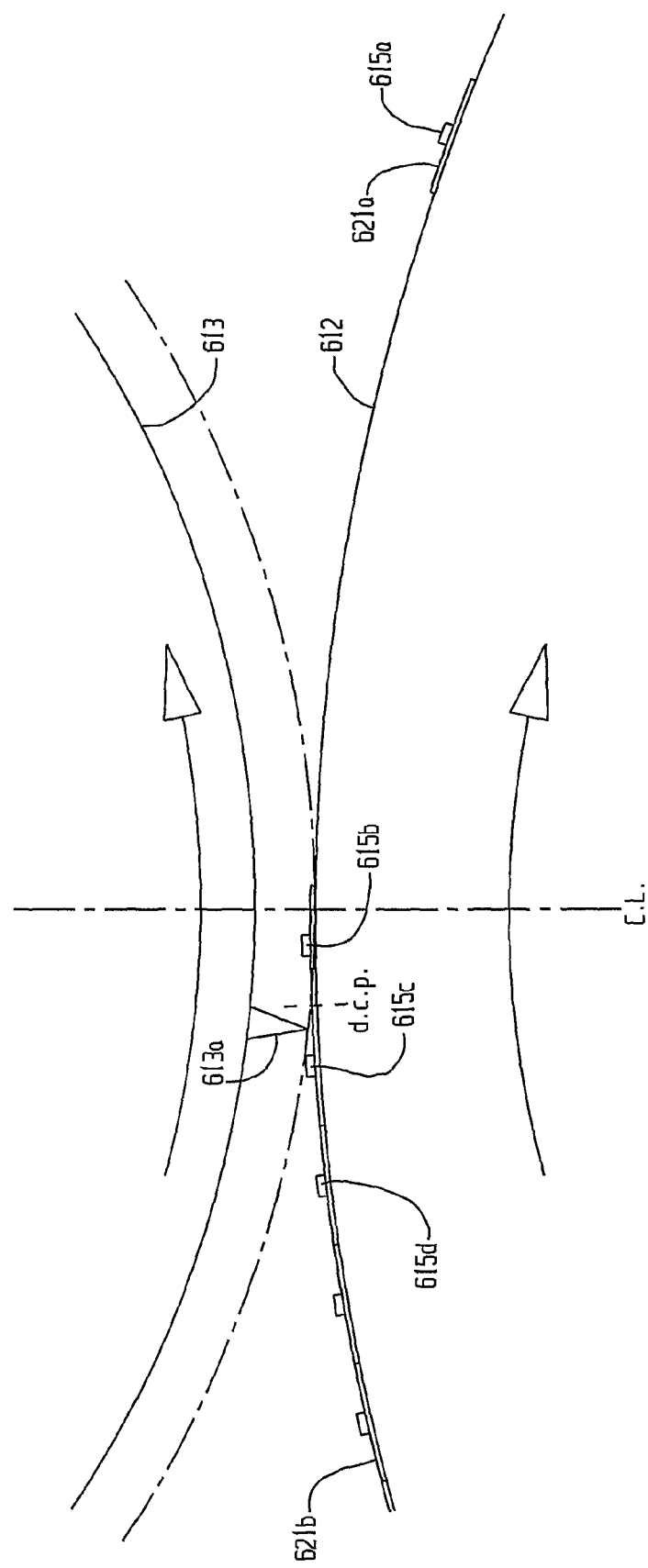

FIG. 6C shows a further subsequent step in the cut cycle of the second embodiment. The dashed line d.c.p. (which represents a transverse vertical plane in the drawing), indicates the desired cut position on the strap web 621b. The edge of cutting blade 613a should penetrate and sever the strap web 621b as the d.c.p. line reaches the centerline (C.L.), (also a transverse plane), of the cutting and vacuum cylinders, (i.e. a line or plane passing through the respective axes of rotation of the cutting cylinder 613 and vacuum cylinder 612) As shown in FIG. 6C, the cutting edge of cutting blade 613a is somewhat behind the d.c.p. This allows a slight amount of space for the cutting blade edge to accelerate as much as the servo drive for the cutting cylinder 613 will allow. The closer the speed of cutting tip or cutting edge of blade 613a reaches or matches the surface speed of vacuum cylinder 612, the less the tip or cutting edge of blade 613a will scrub the surface of vacuum cylinder 612. This will increase the life of tip or cutting edge of 613a and the surface of vacuum cylinder 612.

Figure 6D:
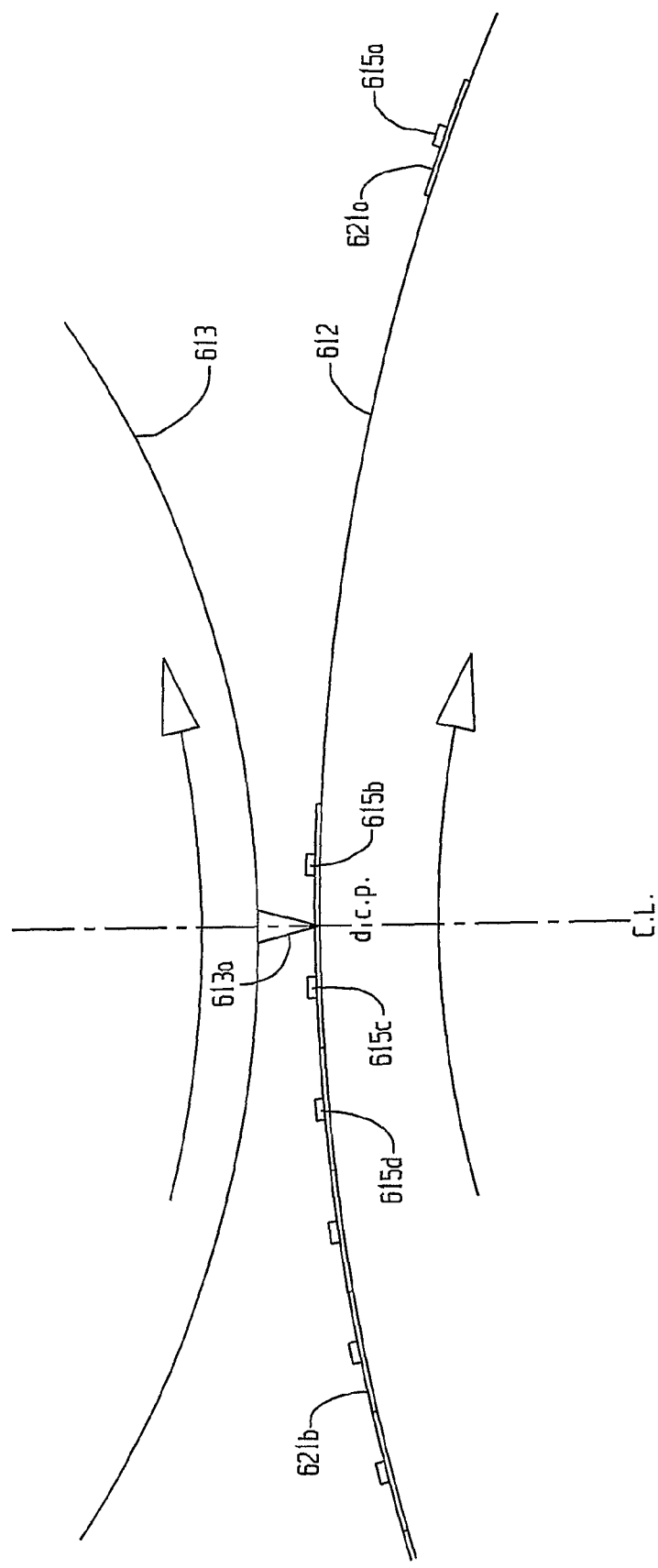

FIG. 6D illustrates the end of a cutting cycle. Tip or cutting edge of 613a has reached the center line C.L. and strap web 621b has been severed at the desired cutting position, typically midway between microchips 615b and 615c. Preferably, blade cylinder 613 will have accelerated so that the speed of the cutting edge of blade 613a matches the surface speed of vacuum cylinder 612 to improve the life of tip or cutting edge of blade 613a. After the cut is completed, blade cylinder 613 transitions to its normal motion profile and positions blade 613a for the next cutting sequence.

In a third embodiment, the methods described herein and illustrated in FIGS. 5A-D (varying the strap web feed motion profile) and FIGS. 6A-D (varying cutting blade angular velocity profile) may be combined. This combination will maximize the speed of successfully cutting individual straps from a strap web while reducing tension variations in the strap web and also reducing acceleration of the cutting cylinder thus reducing demands on the servo system driving the cutting cylinder and allowing the system to be effective in even more difficult situations. For example, if the pitch 'r' of chips on the strap web before cutting is reduced from 5 mm to 4 mm the speed of the cutting edge of blade 613a travels almost 39 times faster than the strap web 621b. Further the clearance (designated clr in FIG. 6B) between the tip or cutting edge of blade 613a and the height of the leading edge of chip 615c is about 0.1 mm (0.004"). Slight position errors or deviations of the strap web 621b and/or cutting cylinder 613 may result in undesired contact between the tip of blade 613a and the forward edge of the microchip 615c. In which case, the strap web 621b may be retarded or reversed a slight amount, for example, 0.5 mm (0.020") at this time of the cycle, to increase clearance clr significantly, in this example, to about 0.25 mm (0.010").

Figure 7:
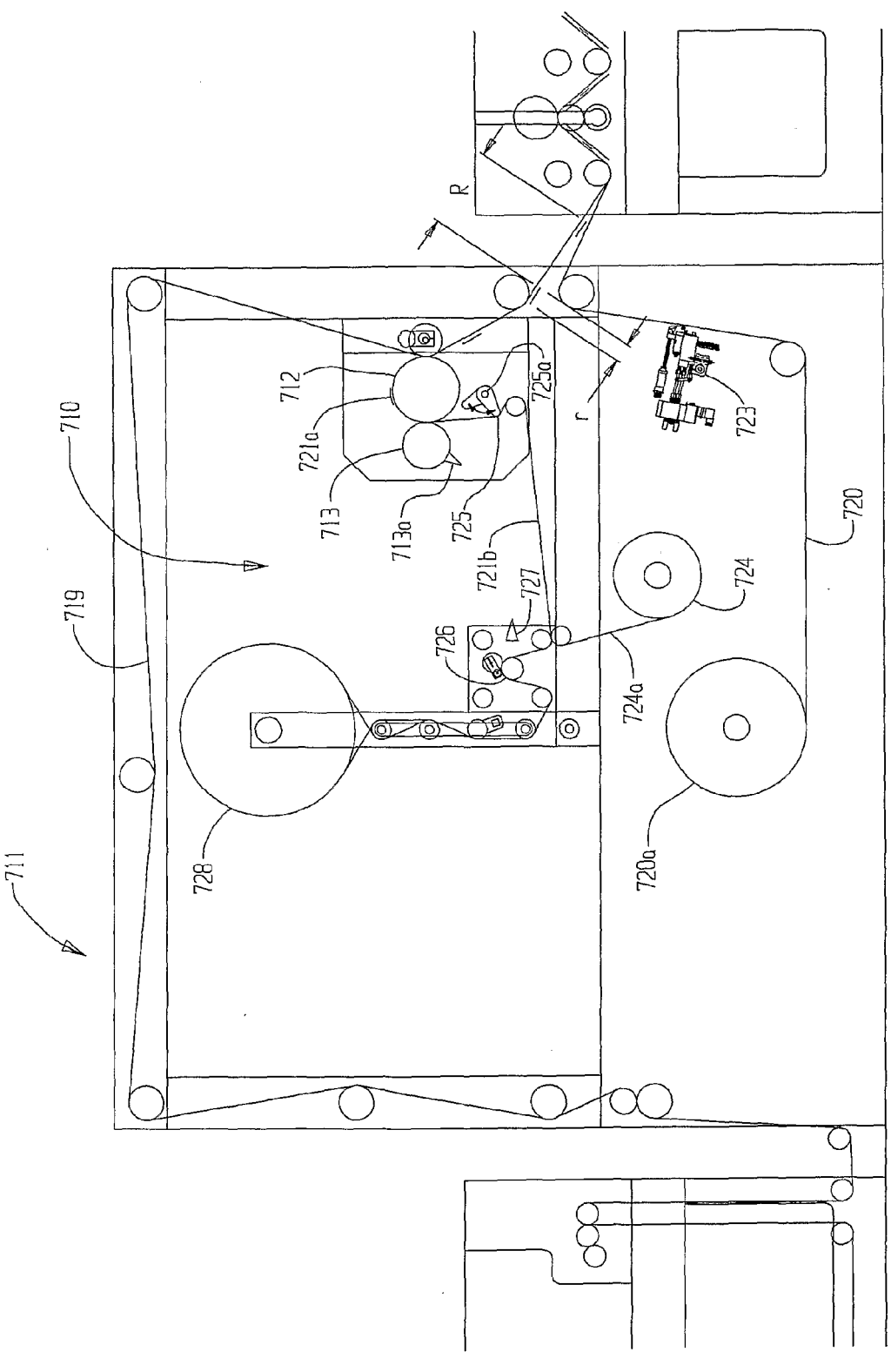
FIG. 7 is a side schematic view of an applicator for feeding, cutting and applying RFID straps.

A motion profile reversal may be accomplished by a slight reversal of feed roller 211 (FIG. 2) prior to resuming a forward motion profile to provide a net feed amount of strap pitch r, in this example, 4 mm per cutting cycle. Referring to FIG. 7, the motion profile reversal may be accomplished by a mechanical cycling device, such as a roller that engages and deflects the strap web 721b via an eccentric or swingarm drive 725. Such mechanical additions would be less preferred for their addition of complexity, parts count, and cost, compared to providing the desired motion profile via the feed cylinder 211 servo drive.

However the extra cost and complexity of a swing arm or web deflector 725 can provide functional benefits. The web deflector 725 is operated by a programmable servo drive so that the strap web 721b may be deflected to temporarily and cyclically vary the speed and position of the strap web 721b relative to the vacuum cylinder 712 and cutting blade 713a according to the illustrations of FIGS. 5A-5D and the associated disclosure herein. As the deflector 725 rotates in a counter-clockwise direction on its axle 725a, it reduces, or can even reverse, the speed of the strap web 721b relative to the surface of the vacuum cylinder 712 and approaching blade 713a. This allows the blade 513a to move into a position between adjacent chips 515b and 515c as shown in FIG. 5B. Then the deflector moves in a clockwise direction and the strap web 721b may accelerate momentarily to a speed approaching that of the vacuum cylinder 712 surface and tip or cutting edge of blade 713a in order to maintain the tip or cutting edge of blade 713a between microchips 515b and 515c as shown in FIGS. 5C and 5D. Recalling that for the repeats 'r' and 'R' of 5 mm and 6⅛" respectively and exemplified herein, the tip or cutting edge of blade 713a and vacuum cylinder 712 surface are traveling, on average about 30 times faster than the feed rate of strap web 721b. Thus, the motion of the deflector 725 can substantially vary the speed of the web 721b while maintaining tension in the strap web from the pull of the vacuum cylinder. The use of a web deflector 725 also provides an advantage in that the feed roller 726 may rotate at a constant rate which simplifies scanning the strap web 721b with a scanner 727. As with the prior art applicator shown in FIG. 2, scanner 727 provides a timing signal so that the strap web 721b may be cut in the desired location to deliver straps 521a (FIG. 5). The desired cutting location has been referred to herein as the desired cut position or "d.c.p." The desired cut position is shown in FIGS. 4A-D, 5A-D, 6A-D as roughly halfway between the microchips 415b,c, 515b,c, and 615b,c, respectively. The desired cut position may also be chosen with respect to other features on the strap such as electrical contact pads 317 (FIG. 3) In FIG. 3, the contact pads 317 and chip 315 are illustrated as symmetric with respect to a line bisecting strap 316 in the cutting direction and so a desired cutting point midway between chips such as 515 b,c is preferred. However contact pads 317 need not be symmetrical and in such case the desired cutting position may not be midway between chips such as 515b,c (FIGS. 5A-D). Scanner 727 allows features such as the pads 317 or chip 315 to be sensed and provide a timing signal to a servo control system (FIG. 8) and thereby allow selection of the desired cutting position in accordance with the features on the strap web 521b, 621b, 721b. The terms "registration" and "indexing" are used in the art to describe performing one operation in a positional relationship to another operation. In this invention the cut is made 'in register to' or 'in registration with' the contact pads 317 and/or chip 315 (FIG. 3).

If the strap web 721b speed varies (or even reverses) as the strap web is scanned, it becomes more difficult to assure the cut occurs at the desired cut position (d.c.p., FIGS. 5A-D). Another advantage of use of a web deflector 725 and the related constant feed rate of feed roller 726 is that RFID strap web roll 728 may rotate at a more constant velocity. This helps reduce the possibility of damage to the strap web 721b that may be caused by rapid, cyclic speed and tension variations.

FIG. 7 shows the applicator section 711 with applicator components 710 including some of the additional components used to attach RFID straps to antennas to make RFID labels. In this case the press does not start with a roll of labelstock 18a (see FIG. 1). Rather the press makes label stock in situ, and includes a source roll of facestock to supply facestock web 719. Liner unwind station 720a provides liner web 720. The label adhesive may be provided by hot melt adhesive applicator 723 to provide a continuous coating of pressure sensitive adhesive. Alternatively, unwind station 720a may be used to unwind a transfer tape (i.e. a combination of release liner and pressure sensitive adhesive). In this case, adhesive applicator 723 would not be required.

Figure 3:
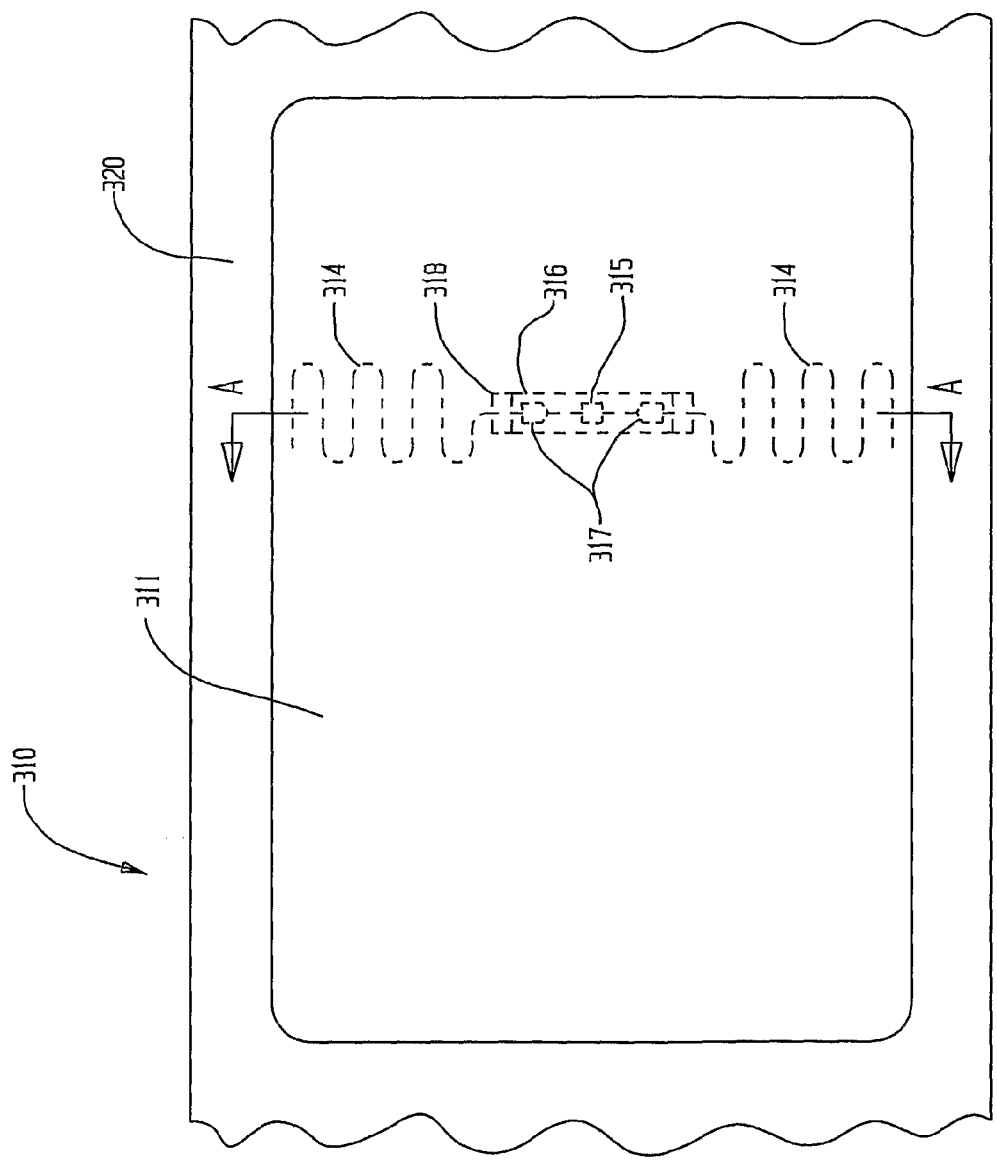
FIG. 3 is a top view of an RFID label with a printed antenna and a RFID strap.
Figure 3A:
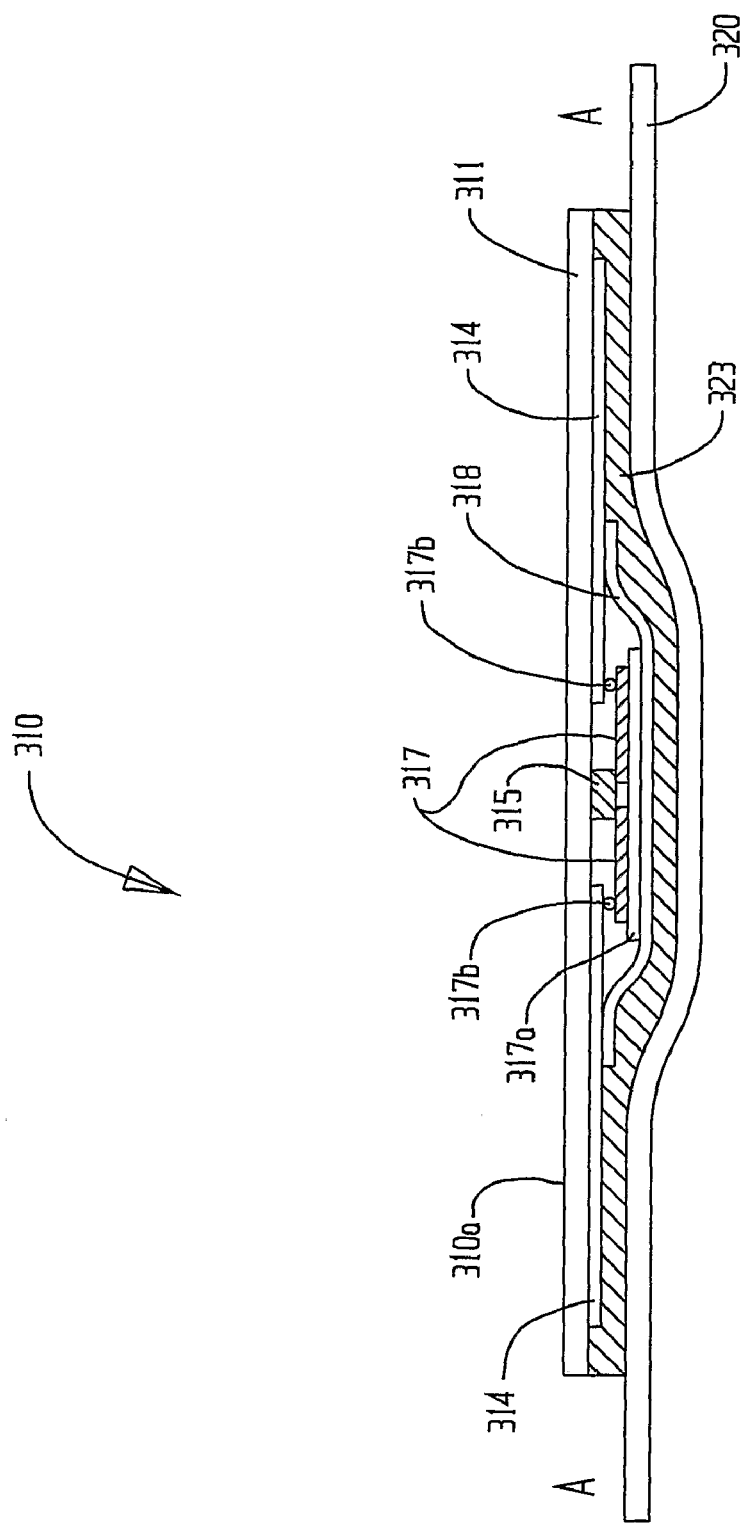
FIG. 3A is an enlarged vertical transverse cross section view of the RFID strap of FIG. 3 assembled to label stock.

Tape laminate unwind station 724 provides a tape corresponding to tape 318 of FIGS. 3 and 3A. The tape web is laminated to the strap web 721b and proceeds to the vacuum cylinder 712 where it will be cut by blade 713a at the same cut length as the strap 316 (of FIG. 3), 'r', to provide singulated tape/strap combination 721a. The tape 318 of FIG. 3 has several functions, among them, it holds the strap in place while any adhesive, conductive or otherwise, which electrically connects the strap 316 via pads 317 to the antenna 314, is cured, dried, impressed, or undergoes other processing. The tape 318 also provides additional protection to the strap and may serve to protect the electrical connection between the strap 316 and antenna 314 in cases where the electrical bond to the antenna 314 is relatively weak and/or brittle. Preferably, tape 318 is as thin as practical, because the thickness of tape 318 increases the effective height of microchips or other superposed elements, and, despite the stated advantages, exacerbates the problem addressed by the present invention.

Figure 8:
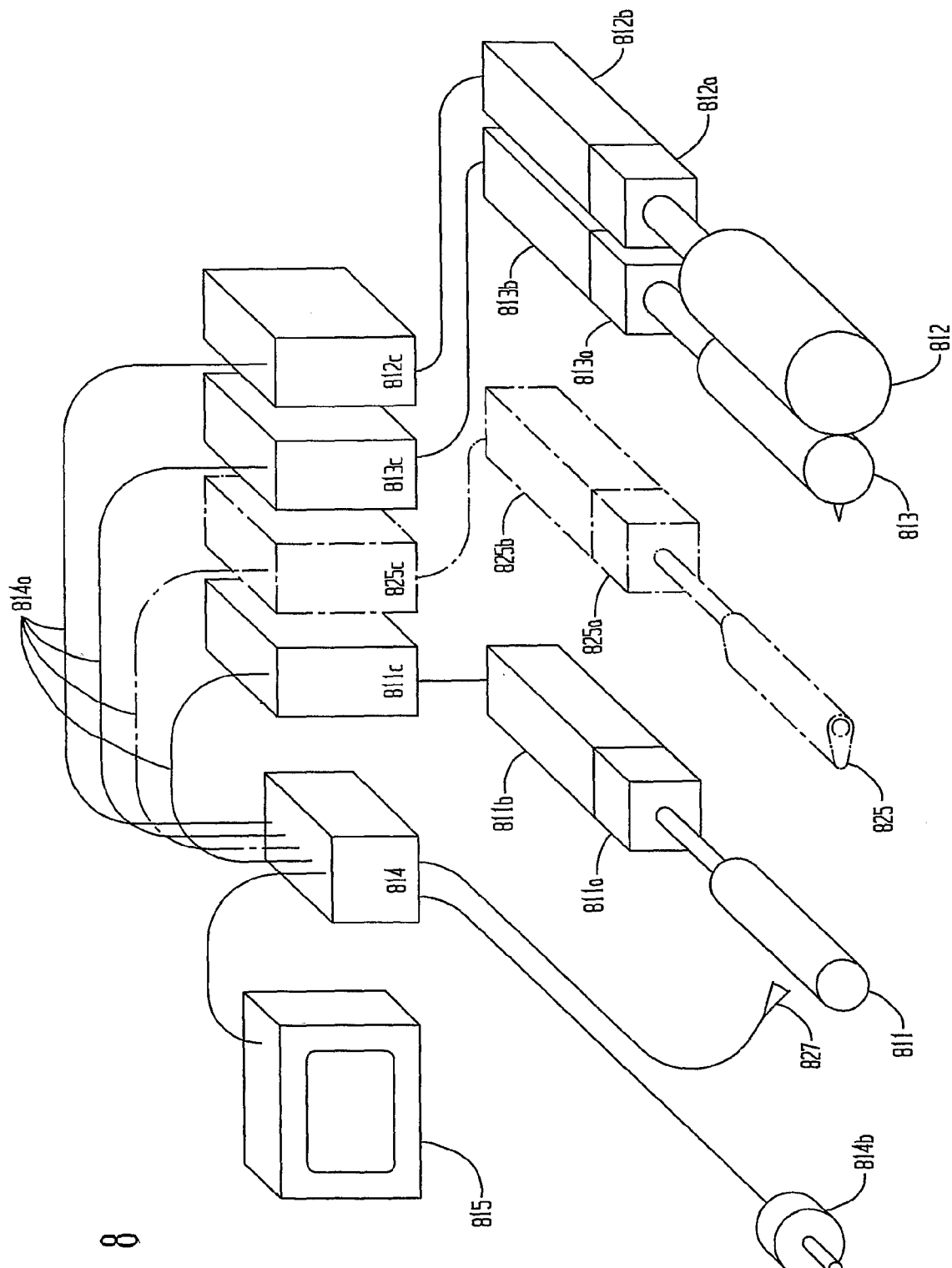
FIG. 8 is a schematic diagram of a system for controlling both the feed rate of the strap web and the angular velocity of the cutting cylinder in accordance with the present invention.

FIG. 8 shows a functional diagram of the servo drive system for the strap applicator 710 of FIG. 7. The system operator may enter basic parameters such as desired repeats 'r' and 'R' (see FIG. 7) via an operator interface 815 such as UniOP Exor touchscreen 815 provided by SITEK S.p.A. of San Giovanni Lupatoto VR, Italy.

The touch screen commands are sent to an Indramat (of Lohr am Main, Germany) PPC (Power PC) processor 814 where they interact with commercially available Visual Motion software provided by Indramat modified as desired to calculate and coordinate speed and position commands for each servo drive 811c, 812c and 813c. A rotary encoder 814b is connected to the flexopress main drive shaft or other press mechanical drive to provides basic press speed and position inputs to the controller 814. Scanner 827 as provided by Keyance of Woodcliff Lake, N.J. scans the RFID strap web 721b (FIG. 7) to sense physical features such as the microchip 315 or contact pads 317 (FIG. 3) and provide a timing signal to servo processor 814.

Accordingly, the programs control and coordinate the feed roller 811 and cutting cylinder 813. The commands from data processor 814 are transmitted on fiber optic links 814a using SERCOS (serial real time communication standard) protocol. Each servo drive 811c, 812c and 813c uses the commands to power their respective servo motor as well as to monitor servo motor position, speed, and acceleration. The combination of servo motor and servo drive, for example 811c and 811b is often referred to as a servo axis. The PPC processor 814 can coordinate and control up to 32 axes.

Each servo motor, for example 811b, is connected to a reduction gearbox 811a, for example, as provided by GAM Gear of Harwood Heights, Ill. In turn, the gearbox 811a drives the feed cylinder 811. Similarly, vacuum cylinder 812 may be driven with a servo motor 812b and reduction gearbox 812a. Blade cylinder 813 is driven by servomotor 813b via gearbox 813a.

An additional servo axis consisting of 825a-c is shown driving deflector 825 in phantom lines in FIG. 8. This provides the alternate means of controlling the feed rate of strap web 721b relative to the blade 713a described herein.

We claim:

1. A method of separating individual straps from a continuous strap web including a continuous base web having a generally uniform thickness and an upper surface, said strap web extending along a length direction, and a plurality of superposed elements fixed to said upper surface of said base web and spaced along said base web in said length direction, each superposed element having a forward edge extending above said upper surface of said base web, said method comprising:
- feeding said strap web along the surface of a rotating vacuum cylinder;
- cutting said strap web into units of predetermined length with a rotating cutting cylinder having at least one blade extending outwardly of a cylindrical surface of said cutting cylinder, a cutting edge of said blade effecting a cut in cooperation with said vacuum cylinder when said cutting cylinder and vacuum cylinder are rotated, each cut of said strap web defining the start of a cut cycle, the path of said cutting edge of said blade defining a cut profile,
- each cut cycle further including the steps:
- after each cut of said strap web, reducing the feed rate of said strap web while maintaining tension on said strap web with said vacuum cylinder;
- controlling the feed rate of said strap web such that said blade advances between two adjacent superposed elements without cutting either of said elements;
- thereafter increasing the feed rate of said strap web such that for each successive cutting cycle, said blade cuts said strap web at a desired cutting position between adjacent superposed elements on said strap web.

2. The method of claim 1 wherein each cut cycle includes cutting said strap at said desired cutting position while said desired cutting position is located adjacent or on a cut line defined by a plane passing through axes of rotation of said cutting cylinder and said vacuum cylinder.

3. The method of claim 1 wherein for each cut of said strap web, said desired cutting position is located approximately midway between adjacent individual ones of said elements.

4. The method of claim 1 wherein said elements include RFID chips.

5. The method of claim 1 wherein said strap web engages an outer surface of said rotating vacuum cylinder and further including the step of controlling the feed rate of said strap web such that the speed of said strap web is no greater than the surface velocity of said vacuum cylinder at the location at which said strap web engages said vacuum cylinder.

6. The method of claim 1 further including for each cut of said strap web, the steps of determining said desired cutting position in relation to at least one detectable feature on said strap web; and controlling the speed of the cutting cylinder and said vacuum cylinder during a cut such that the cutting edge of said blade and the surface of said vacuum cylinder contacted by said cutting edge during a cut have substantially the same speed.

7. The method of claim 1 wherein said elements are separated by a uniform spacing.

8. A method of cutting individual segments from a continuous strap web including a continuous base web and a plurality of elements fixed to an upper surface of said base web, each element having a forward edge extending above said upper surface of said base web, a space between adjacent elements including a desired cutting position for severing said strap web to form adjacent segments, said method comprising the steps of:
- feeding said strap web onto the surface of a vacuum cylinder rotating at a generally constant angular velocity and thereby inducing tension on said strap web;
- cutting said strap web with a rotating cutting cylinder having a radially extending blade to form an individual strap of predetermined length by cutting said strap web with said blade of said rotating cutting cylinder at said desired cutting position on said strap web while said strap web is being supported by said rotating vacuum cylinder;
- carrying said severed segment away from said desired cutting position on the surface of said vacuum cylinder;
- controlling the angular velocity of said cutting cylinder after said strap web is severed such that said cutting blade may advance between two adjacent elements including a first element on the next strap to be cut and a second element on the strap adjacent said next strap to be cut, without contacting either of said first and second elements; and
- after said cutting blade has advanced between said two adjacent elements, further controlling the angular velocity of said cutting cylinder such that said blade severs said strap web and repeats said step of cutting said strap web cyclically at said desired cutting position on said strap web.

9. The method of claim 8 wherein said step of cutting said strap web includes positioning said desired cutting position at a cut line defined by a plane passing through axes of rotation of said vacuum cylinder and said cutting cylinder.

10. The method of claim 9 further comprising the step of controlling the angular velocity of said cutting cylinder such that a distal cutting edge of said cutting blade has a velocity substantially equal to the surface velocity of said vacuum cylinder during cutting.

11. The method of claim 10 further including: accelerating each strap cut from said strap web to increase the pitch of adjacent straps.

12. The method of claim 8 wherein said desired cutting position is approximately midway between adjacent superposed elements.

13. The method of claim 12 further comprising the step of locating said desired cutting position in relation to a detected physical feature of each individual strap of said strap web.

14. The method of claim 8 wherein the spacing between adjacent elements on said strap web along the length of said strap web is uniform.

15. A method of separating individual straps from a strap web including a continuous strap web having a generally uniform thickness and an upper surface, said strap web including a plurality of superposed elements fixed to said upper surface of said strap web and spaced along the length of said strap web, each superposed element having a forward edge extending above said upper surface of said strap web, said method comprising:
- feeding said strap web along the surface of a rotating vacuum cylinder;
- cutting said strap web into individual patches of predetermined length with a rotating cutting cylinder having at least one blade extending outwardly of a cylindrical surface of said cutting cylinder, a cutting edge of said blade effecting a cut of said strap web in cooperation with said vacuum cylinder when said cutting cylinder and vacuum cylinder are rotated, each cut of said strap web defining the start of a cut cycle;
- each cut cycle further including the steps:
- deflecting said strap web from its normal path, thereby reducing the speed immediately upstream of a cut zone, while maintaining tension on said strap web with said vacuum cylinder;
- said reduction in speed of said strap web being such that said blade does not contact said superposed elements;
- thereafter releasing the deflection of said strap web, thereby increasing the speed of said strap web in the cutting zone, whereby said blade strikes a desired cutting position between adjacent elements on said strap web; and controlling the speed of said strap web in said steps of deflecting and releasing such that said blade engages and cuts said base strap at a desired cut point location.

16. The method of claim 15 wherein each cut cycle includes cutting said strap at said desired cutting position while said desired cutting position is located adjacent or on a cut line defined by a plane passing through axes of rotation of said cutting cylinder and said vacuum cylinder.

17. The method of claim 16 wherein for each cut of said strap web, said desired cutting position is located approximately midway between adjacent elements.

18. The method of claim 17 wherein said elements include RFID chips.

19. The method of claim 15 wherein said step of deflecting said strap web comprises engaging said web with a moveable arm.

20. The method of claim 15 wherein for each cut of said strap web said desired cutting position is located in register with at Least one physical feature on said strap web.

21. The method of claim 15 wherein the spacing of adjacent elements on said strap web is uniform.

22. The method of claim 15 wherein said blade and said vacuum cylinder are arranged such that said vacuum cylinder acts as an anvil.

* * * * *